United States Patent
Pohja et al.

(10) Patent No.: US 7,487,238 B2
(45) Date of Patent: Feb. 3, 2009

(54) INFECTION-BASED MONITORING OF A PARTY IN A COMMUNICATION NETWORK

(75) Inventors: Leena Pohja, Tuusula (FI); Martti Lumme, Helsinki (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 10/508,727

(22) PCT Filed: Apr. 12, 2002

(86) PCT No.: PCT/IB02/01221

§ 371 (c)(1),
(2), (4) Date: Sep. 17, 2004

(87) PCT Pub. No.: WO03/088634

PCT Pub. Date: Oct. 23, 2003

(65) Prior Publication Data

US 2005/0210127 A1    Sep. 22, 2005

(51) Int. Cl.
*G06F 15/173* (2006.01)
(52) U.S. Cl. ............... 709/224; 709/223; 709/227; 455/461
(58) Field of Classification Search ......... 709/223, 709/224, 227; 455/461
See application file for complete search history.

(56) References Cited

U.S. PATENT DOCUMENTS

| | | | |
|---|---|---|---|
| 5,881,132 A | 3/1999 | O'Brien et al. | 379/35 |
| 5,887,253 A * | 3/1999 | O'Neil et al. | 455/418 |
| 5,974,309 A * | 10/1999 | Foti | 455/412.1 |
| 6,449,474 B1 * | 9/2002 | Mukherjee et al. | 455/414.2 |
| 7,295,848 B1 * | 11/2007 | Eloranta | 455/461 |
| 2001/0038626 A1 * | 11/2001 | Dynarski et al. | 370/356 |
| 2001/0043561 A1 * | 11/2001 | Burns et al. | 370/216 |

FOREIGN PATENT DOCUMENTS

| | | |
|---|---|---|
| WO | WO 99/55062 | 10/1999 |
| WO | WO 01/60098 | 8/2001 |
| WO | WO 0160098 A1 * | 8/2001 |

* cited by examiner

*Primary Examiner*—Liangche A Wang
(74) *Attorney, Agent, or Firm*—MacDonald Illig Jones & Britton LLP; Robert M. Bauer, Esq.

(57) ABSTRACT

The present invention relates to a method and network device for monitoring a party in a communication network, wherein a link information linking at least two types of identifier data for identifying parties to be monitored is stored, and a correspondence between the stored link information of the monitor party and identifier data supplied from the communication network for the monitored party is checked. A new link information linking supplied non-matching identifier data to a stored other type of the at least two types of identifier data linked by the stored link information is added to the stored link information, to thereby provide an automatic Subscriber Identity Module (SIM) infecting feature. Thereby, no connections are missed as each new set of identifier data generates a new entry in the database.

16 Claims, 5 Drawing Sheets

INFECTION-BASED MONITORING OF A PARTY IN A COMMUNICATION NETWORK

FIELD OF THE INVENTION

The present Invention relates to a method and network device for monitoring a party in a communication network, and specifically to a lawful interception in a cellular network.

BACKGROUND OF THE INVENTION

The provision of a lawful interception is a requirement of national law, which is usually mandatory. From time to time, a network operator and/or a service provider will be required, according to a lawful authorization, to make available results of interception relating to specific identities to a specific interception authority or Law Enforcement Agency (LEA).

There are various aspects of interception. The respective national law describes under what conditions and with what restrictions interception is allowed. If a LEA wishes to use lawful interception as a tool, it will ask a prosecuting judge or other responsible body for a lawful authorization, such as a warrant. If the lawful authorization is granted, the LEA will present the lawful authorization to an access provider which provides access from a user's terminal to that network, to the network operator, or to the service provider via an administrative interface or procedure.

Such a lawful interception functionality is also needed in the packet switched part of new mobile or cellular data networks such as GPRS (General Packet Radio Services) or UMTS (Universal Mobile Telecommunications System) networks.

Generally, when monitoring communications made or received by a monitored party in, for instance, a GSM (Global System for Mobile communications) system, or the above mentioned new packet switched networks, problems can occur in correctly tracing the party to be monitored. The monitoring or interception criteria known by the authorities are normally the mobile destination identifier (such as the phone number) of the monitored subscriber, e.g. the MSISDN (Mobile Subscriber ISDN Number) or subscriber's mobile destination identifier. The interception activation is therefore usually based on the MSISDN. However, when criminals become aware of interception activities, they may for example use prepaid SIM (Subscriber Identity Module) cards so that MSISDN-based interception becomes rather difficult. Therefore, it might be considered to use the IMEI (International Mobile Station Equipment Identity) as the interception activation criteria, as it is more difficult and expensive for the monitored parties to change their equipment instead of usually free SIM cards. Moreover, there exists an additional information, the IMSI (International Mobile Subscriber Identity), that internally identifies the subscriber in a unique manner. However, the authority (normally the LEA but eventually also a licensed private agency or the like) activating the interception does not know the IMSI, so that the MSISDN is more convenient for practical use.

Usually, the MSISDN and the IMSI have a one-to-one correspondence, with the mapping information being stored in a subscriber database, e.g. the HLR (Home Location Register) or the HSS (Home Subscriber Server). Although, theoretically, the MSISDN can therefore be mapped to the IMSI using the subscriber database information, this mapping necessitates time consuming processes and should thus be avoided if possible. Furthermore, the subscriber database is regularly updated so that it is laborious to maintain correct mapping information in the interception devices.

In document WO 01/60098 A1, a monitoring system for collecting information on a party in a communication network is described. A monitoring device is adapted to detect the occurrence of identification data generated when a party is starting or receiving a communication, and collects this information in a database. For deciding on monitoring a communication, the database is addressed for comparing the actual identification information with the data stored in the database, and the monitoring of the party is started when the data corresponds to stored identifier data, such as the destination identifier of a party to be monitored, the party's identification data or the party's equipment identification data. By storing in the database a list of correspondence (concordance list) between the different identification information pointing to the monitored parties, an interception is also possible based on information which is normally not available. For instance, interception based on the IMEI is possible even for visitor subscribers without roaming contracts with their home networks, since no access to the subscriber database of the visitor subscriber network is required. A small database storing the identification information necessary for monitoring purposes is sufficient. In particular, the party's identification data stored in the database may be the IMSI, the MSISDN or IMUI (International Mobile User Identity), and the equipment identification stored in the database may be the IMEI.

According to the above known monitoring system, an interception device receives a notification whenever a tunnel or session is activated. These notification messages always contain the IMSI and optionally the MSISDN or the IMEI. The interception device then collects IMSI-MSISDN-IMEI triplets in the database, wherein the MSISDN or the IMEI may be missing. Furthermore, the database contains an information on whether the interception of a particular triplet is activated or not. When a triplet of a monitored party is received and the IMEI is found from the database but the IMSI does not map to the stored one, this means that the IMEI is now used with another SIM card. Therefore, the old IMEI is removed and a new item is added to the database.

Thus, at present, legal interception of voice or data traffic in cellular systems is possible based on the IMSI, the MSISDN or the IMEI mobile identifiers, wherein the MSISDN and the IMSI map to the SIM card, and the IMEI maps to the mobile station equipment.

However, suspects or parties to be intercepted have learned to evade the surveillance by e.g. using prepaid SIM cards and by switching their equipment, which is made possible by decreasing equipment prices and the fact that most operators nowadays offer prepaid SIM cards. Thus, it may not be possible for the authorities to keep intercepting a person's voice or data traffic based only on the MSISDN or IMSI number. Moreover, switching prepaid SIM cards between mobile phones generates a mobile station which is completely new in the system, such that it will not be detected even in IMEI-based surveillance.

SUMMARY OF THE INVENTION

It is therefore an object of the present invention to provide a monitoring method and device, by means of which any kind of surveillance avoiding can be detected.

This object is achieved by a monitoring method as claimed in claim 1 and by a monitoring network device as claimed in claim 10.

Accordingly, by checking the correspondence between the stored link information and the identifier data supplied from the communication network, and by adding new link information linking non-matched identifier data to already stored other types of identifier data, all mobile identification numbers or identifiers which are interlinked in any way with an already intercepted device can be tagged. Thus, different types of identifier data "infect" each other if equipments and SIM cards are changed. This provides a way to automate the tagging of interlinked mobile identifiers. Each time the interception device is notified about session activation, it checks if a corresponding combination of identifier data already exists in the database. If a match is not found, an infecting procedure is enabled, wherein a new entry is added into the database. Such an infection will guarantee a better coverage of the detected tries to deceive interception devices by switching identifiers, and will also reduce required manual work by the LEAs.

It is noted that the term "interception device" used herein is intended to cover any device which can be used for interception puposes.

Moreover, a location-based infecting is possible if mobile identifiers frequently detected in the same area with an already intercepted target, e.g. in the same base station (BS) or even radio network controller (RNC) area, are also tagged for interception.

Preferably, the link information may be a look-up table. Furthermore, the at least two types of identifier data may comprise a party's identification data and a party's equipment identification data. The party's identification data may comprise at least one of an IMSI, an MSISDN, and an IMUI, and said party's equipment identification data may comprise an IMEI. The IMSI may be updated in the stored link information based on the supplied identifier data.

According to an advantageous further development, the at least two types of identifier data may comprise a location area of the monitored party, and the correspondence may be checked by applying a statistical analysis concerning the appearance within the location area. Then, the supplied identifier data may be obtained by the communication network based on a paging operation within the location area. The non-matching identifier data may comprise an IMSI and the other type of identifier data may correspond to the location area.

Alternatively, the correspondence may be checked by comparing a pair of party's identification data and party's equipment identification data.

Further advantageous developments are defined in the dependent claims.

BRIEF DESCRIPTION OF THE DRAWINGS

In the following, the present invention will be described in greater detail based on a preferred embodiment with reference to the drawings figures, in which.

DESCRIPTION OF THE PREFERRED EMBODIMENT

The preferred embodiment will now be described on the basis of a GPRS-based lawful interception system according to FIG. 1.

Figure 1:
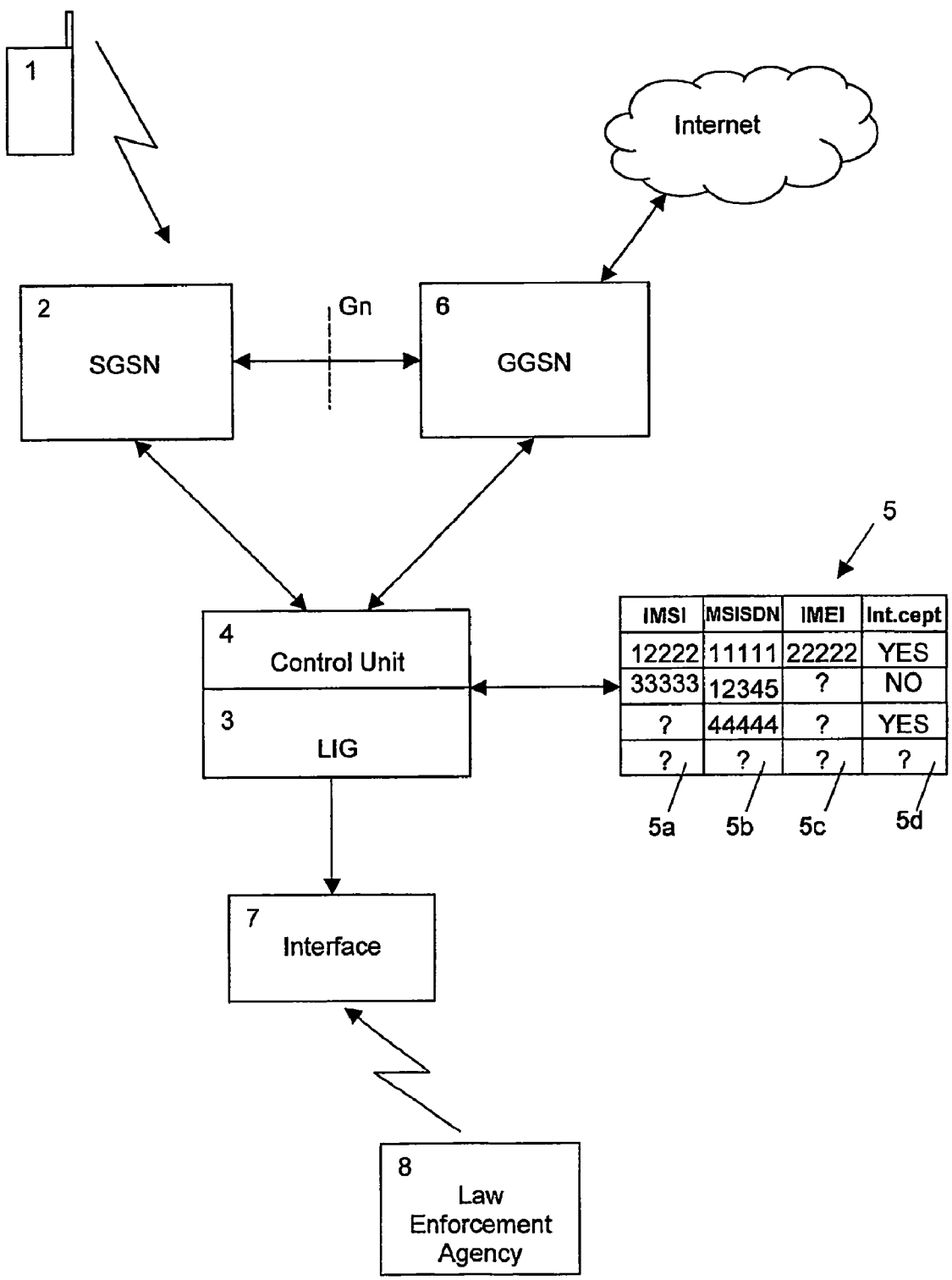
FIG. 1 shows a schematic diagram of a basic structure of a GPRS-based lawful interception system according to the preferred embodiment.

FIG. 1 shows a mobile terminal or mobile station 1 which communicates with GPRS support nodes (GSNs) by radio transmission. In particular, the GPRS system shown in FIG. 1 comprises a serving GPRS support node (SGSN) 2 which communicates with a gateway GPRS support node (GGSN) 6 via a Gn interface. The GGSN 6 may also communicate with other networks such as the internet, as schematically shown in FIG. 1.

For monitoring purposes, the system comprises a legal interception gateway (LIG) 3 which contains a control unit 4 for controlling a database 5. The database 5 is arranged for storing identification data used to identify a party (e.g. a subscriber or a visitor to the network). The LIG 3 receives information from, and sends information to an intercepting party such as a LEA 8 by means of an interface 7.

The term "LEA" as used herein stands for any type of official or private institution or person which may legally monitor (intercept) the communications of a certain equipment or person such as a criminal person using, in this example, the mobile station 1. The term "communication" as used herein is not limited to traditional phone calls but may also correspond to SMS (Short Message Service) or WAP (Wireless Application Protocol) connections or any other type of connections.

In the preferred embodiment shown in FIG. 1, an activation of legal interception is allowed on the basis of identification information, i.e. identifier data, preferably MSISDN, IMEI, IMSI, which is sent by the support node 2 and/or the GGSN 6, via a respective interface to the LIG 3 each time a new connection is activated. The LIG 3 stores this identification information in the database 5. Thus, the database 5 finally stores a concordance list of correspondences or relations between the identification information such as IMSI-MSISDN-IMEI (IMI) triplets for one or more parties to be monitored. This allows interception to be based on any of the parameters stored in the database 5. As explained later, even the location area may be used as a parameter on which interception can be based.

The LIG 3 thus provides a function of managing the database 5 by means of the control unit 4 so as to receive the identification information send from the SGSN 2 or the GGSN 6, and to input the same into the database 5 at a proper position. The LIG 3 may as well be integrated to the GGSN 6.

In the present example shown in FIG. 1, the database 5 has a two-dimensional matrix-like structure which comprises four columns 5a to 5d and an arbitrary number of rows depending on the number of listed entries. Column 5a stores the unique subscriber identification information IMSI. Column 5b stores the destination identifier of the subscribers, here the MSISDN (Mobile Subscriber ISDN Number). Column 5c is used for storing equipment identification information, here the IMEI. The fourth column 5d contains data for deciding on interception or non-interception of a party. In the present example, the parties registered in the first and third row of the database are to be monitored whereas the party listed in the second row is not (or no longer) to be intercepted. The database 5 thus stores, in the respective rows, a concordance list showing the correspondence between the individual identification information pointing to the same person or equipment.

Generally, the SGSN 2 and all other support nodes of the cellular telecommunication network inform the LIG 3 about new connections as soon as they are activated. The support nodes deliver the identification information received from the party (e.g. mobile station 1) such as IMSI, MSISDN and IMEI in case of an SGSN, or MSISDN and IMSI in case of a GGSN. Therefore, the interception device (i.e. LIG 3), is able to learn the correspondence between IMSI-MSISDN and IMSI-IMEI as the subscribers use the network. The LIG 3 stores this identification information IMI and therefore has it readily available for later use when activating interceptions. The LIG 3 updates or enhances the database 5 when it recognizes that some information such as IMEI has changed after the latest subscriber activity.

In particular, the SGSN 2 supporting the mobile station 1, or the GGSN 6 notify the LIG 3 each time a session or a tunnel is activated by a subscriber. Upon receipt of such a notification about a session or a tunnel activation, the LIG 3 checks if it already has the corresponding information in its database 5. If the database 5 contains, for one or more IMSI identification information, MSISDN and/or IMEI information differing from the delivered MSISDN or IMEI information, the LIG 3 updates the database 5 by adding the new information. In particular, an SIM infecting is automated e.g. based on an implementation on top of the GPRS interception solution, where the interception device, e.g. the LIG 3, checks if a corresponding IMI already exists in the database 5. If a match is not found, and SIM infecting is enabled, the corresponding IMI is not updated but a new entry is added into the IMI database 5. Also, the new IMEI/MSISDN number must be stored in an additional non-volatile target database (not shown) which may also be provided at the LIG 3 and controlled by the control unit 4. This needs to be done because the correspondence is stored only in a volatile memory of the database 5, and otherwise the new IMEI/MSISDN (IMSI) to be intercepted may be lost when e.g. the size of the IMI part of the database 5 is reduced.

Additionally, a location based SIM infecting is possible, wherein mobile identifiers frequently detected in the same area as an already intercepted target, e.g. the mobile station 1, are also tagged for interception.

The SGSN 2 and the GGSN 6 are hence adapted to send the identification information to the LIG 3 upon start of an activation. The LIG 3 handles the conversion of transmitted MSISDN and IMEI information to the IMSI identification information by referring to the database 5 and reading the corresponding data. If the database 5 should, in some cases, currently not have any information on MSISDN or IMEI corresponding to IMSI information for which an interception is activated, this means that the monitored party has not initiated any communication since the LIG 3 has been attached to the network. As soon as the monitored party places a call, MSISDN and/or IMEI identification information corresponding to the IMSI information is available so that the interception can be started. The interception is therefore always activated before the monitor subscriber actually transfers any data.

The database 5 of the LIG 3 may be managed so as to register only identification information for such rows in which the interception decision, in column 5*d*, is set to "YES".

In another alternative structure, the LIG 3 can also be adapted to register, in database 5, all identification information IMSI, MSISDN, IMEI for all callers which have become active since the start of activation of the interception device. In this case, the volume of the database 5 grows larger and larger with every additional subscriber which becomes active. This latter case provides the advantage of having a concordance list for all available identification information for all subscribers which had become active in the past. Thus, when an interception of a party is to be newly started, the database normally already contains all or at least some of the identification information of the respective subscriber. The interception can then immediately be started when detecting one of the identification information characterizing a monitored subscriber which starts to place a communication.

If the database 5 should become too large, there is always the possibility of simply emptying it totally or at least for all rows containing the interception command "NO". This also contributes to easy recovery from error situations as the database 5 needs not be recovered at all, or only partially, and can always be filled up again for any user which becomes active after the emptying or the error recovery.

Alternatively, the LIG 3 may be programmed so as to always delete all subscribers from the database 5 that are currently not active, i.e. not performing a call. A further possibility is to limit to size of the database 5 to a fixed value so that the implementation is simplified. In such a case, any information on non-monitored parties should be removed from the database 5 as soon as possible in order to avoid any storage problems caused by too small free capacity.

In the following, a detailed description of the changes of contents of the database 5 is given.

It is assumed that the LIG 3 gets "Started" notifications from the SGSN 2 or any other corresponding node whenever a tunnel/session is activated. These messages always contain IMSI and optionally MSISDN and/or IMEI information. The LIG 3 collects the IMI triplets in the database 5, wherein MSISDN or IMEI may be missing, at least initially. The LIG 3 stores the IMI information in the volatile memory of the database 5, and deletes IMI triplets (rows) whenever the database 5 becomes too big. However, the LIG 3 does not delete the IMI triplets for subscribers currently active. The LIG 3 gets "Ended" notifications from the SGSN 2 or any other corresponding node whenever a tunnel/session is terminated. These messages contain at least an IMSI information.

As an example of the implementation according to the present invention, detailed use cases related to the proposed solution are presented now. It is assumed that IMEI check in the SGSN 2 and SIM infecting the LIG 3 are enabled. In this respect, it is noted that the MSISDN is always used in one SIM card only, identified by the IMSI, and the interception is actually based on the IMSI. Therefore, knowing either IMSI or MSISDN is sufficient.

Figure 2:
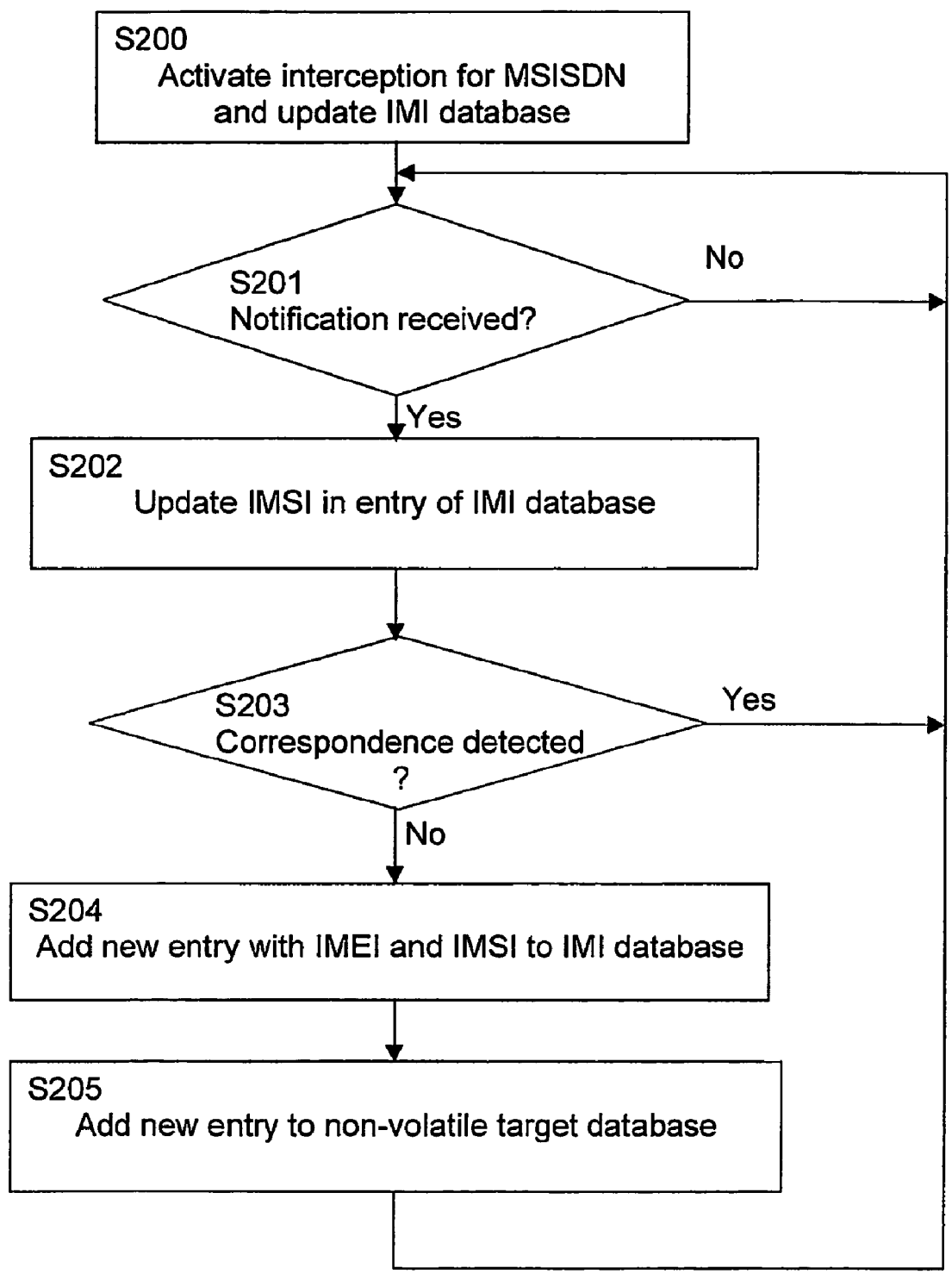
FIG. 2 shows a basic flow diagram of an IMSI-based IMEI infection.

FIG. 2 shows a schematic flow diagram indicating an implication example where a SIM card infects all equipments in which it is used. i.e., the IMSI information infects all IMEIs it is used in.

Not knowing the actual IMSI, an authority, e.g. the LEA 8, or an administration function (ADMF), i.e. the control unit 4 of the LIG 3, of the lawful interception service automatically activates an interception for e.g. MSISDN=11111 and the database 5 is updated, as indicated in step S200. Then, the following entry is added to the database 5:

IMI: (IMSI=?, MSISDN=11111, IMEI=?,
       Intercept=Yes).

Then, in step S201 it is checked whether a Started notification has been received. If not, the procedure waits until a corresponding notification has been received. If e.g. a Started (IMSI=33333, MSISDN=11111, IMEI=22222) notification relating to the activated interception has been received e.g. from the SGSN 2, the contained IMSI is updated into the database 5, such that the corresponding row looks as follows:

IMI: (IMSI=33333, MSISDN=11111, IMEI=?,
        Intercept=Yes).

After the update in step S202, the database 5 is searched to detect in step S203, whether an IMI correspondence already exists. If so, the procedure turns to step S201 and waits for a new notification. If not, i.e. if the correspondence is new, a new entry is added to the database 5, to enable the IMI-based interception. Then, the database comprises the following two entries:

| IMI: | (IMSI = 33333, MSISDN = 11111, | IMEI = ?, | Intercept = Yes) |
|---|---|---|---|
| | (IMSI = 33333, MSISDN = ?, | IMEI = 22222, | Intercept = Yes) |

Thus, the IMEI has been infected by the IMSI and a new interception is generated for the combination of the new IMEI with the known IMSI (step S204).

Additionally, a new entry is added to the non-volatile target database, using the IMEI number and the data from the corresponding MSISDN-based entry (step S205). Then, the procedure returns to step S201 and waits for the receipt of a new notification.

Figure 3:
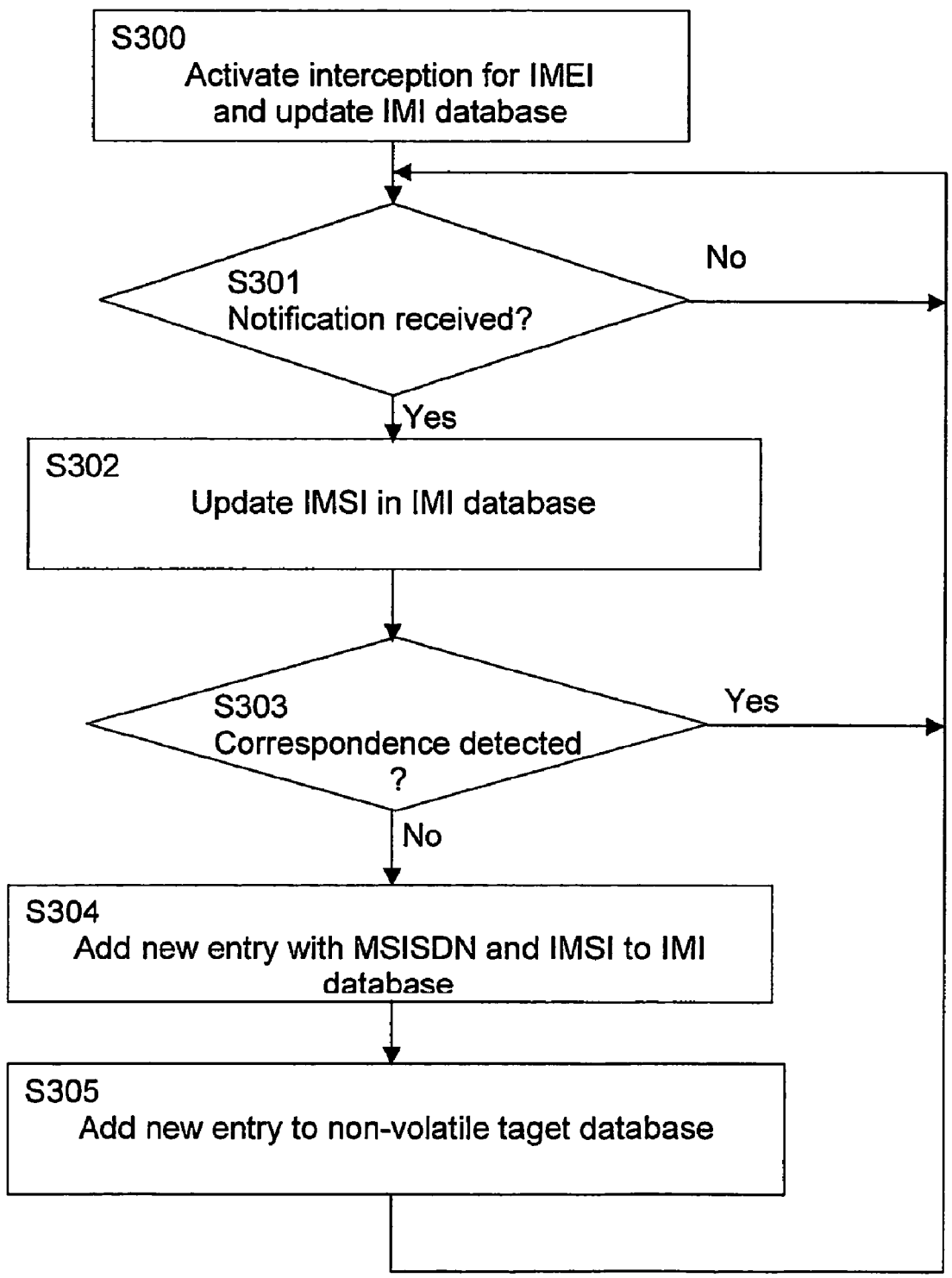
FIG. 3 shows a basic flow diagram of an IMEI-based IMSI infection.

FIG. 3 shows another implementation example where the party's equipment infects the SIM card used therein, i.e. the IMEI identifier infects all IMSI identifiers used in it. In step S300, an authority (or the control unit 4 automatically) activates an interception e.g. for IMEI=66666. Consequently, the database 5 is updated as follows:

IMI: (IMSI=?, MSISDN=?, IMEI=66666,
        Intercept=Yes).

Then, in step S301 it is checked whether a notification has been received. If not, the procedure waits until a notification has been received. If so, e.g. if a Started(IMSI=88888, MSISDN=12345, IMEI=66666) notification has been received from the SGSN 2, the IMSI is correspondingly updated into the database 5 (step S302). Then, the corresponding row looks as follows:

IMI: (IMSI=88888, MSISDN=?, IMEI=66666,
        Intercept=Yes).

Then, in step S303 the database 5 is searched to detect a correspondence by step S303. If a correspondence already exists in the database 5, the procedure returns to step S301. If not, e.g. if the equipment is now used with another SIM card and the correspondence is thus new, a new entry with the MSISDN is added into the database 5 in step S304. Then, the database 5 comprises the following entries:

Thus, a new interception is activated for the combination of the new MSISDN and the known IMSI. Additionally, an entry is added to the non-volatile target database using the MSISDN number and the data from the corresponding IMEI-based entry (step S305). Then, the procedure returns to step S301 and waits for the receipt of a new notification.

Figure 4:
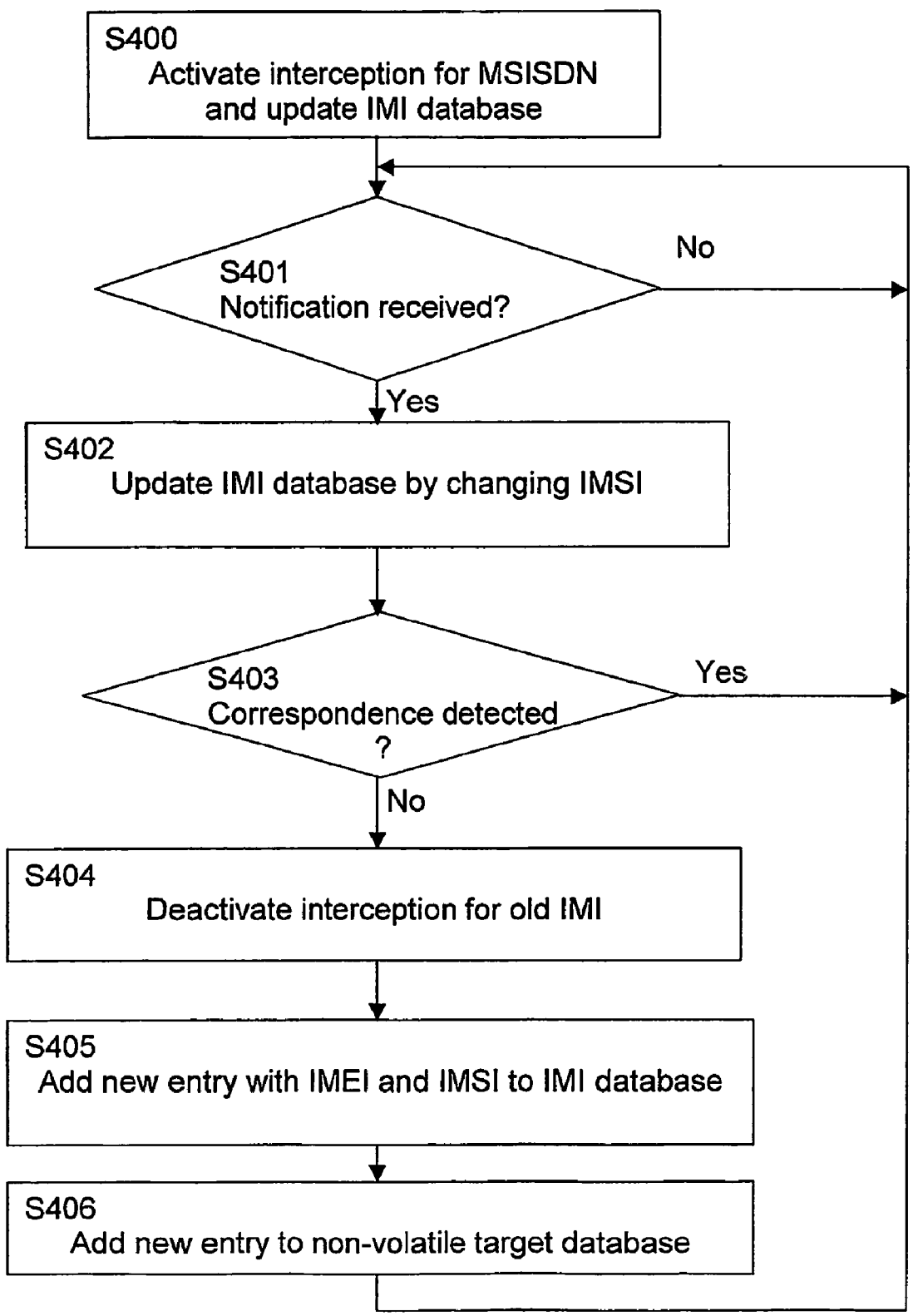
FIG. 4 shows a basic flow diagram of an MSISDN-based IMSI and IMEI infection.

FIG. 4 shows another implementation example, where the MSISDN is infected by all IMSIs and IMEIs used therein. This would happen if an intercepted target equipment, including the SIM, is disposed of, and a new SIM card with the same MSISDN is requested from the operator. In the present case, the LEA 8 has already activated an interception e.g. for the MSISDN=54321 (step S400). The corresponding entry in the database 5 looks as follows:

IMI: (IMSI=33333, MSISDN=54321, IMEI=?,
        Intercept=Yes).

Then, it is checked in step S401 whether a new notification has been received. If not, the procedure returns to step S401 and waits until a notification has been received. If so, e.g. if a Started(IMSI=99999, MSISDN=54321, IMEI=44444) notification has been received from the SGSN 2, the database 5 is updated in step S402 by changing the IMSI, since the IMSI corresponding to the MSISDN does not map to the current one. The change is necessary, as there can be only one valid IMSI for one MSISDN. Consequently, the database 5 now comprises the following entries:

| IMI: | (IMSI = 33333, MSISDN = 54321, IMEI = ?, Intercept = No). |
|---|---|
| | (IMSI = 99999, MSISDN = 54321, IMEI = ?, Intercept = Yes). |

Thus, due to the fact that no correspondence has been detected in step S403, the interception for the old IMI has been deactivated in step S404 by setting the intercept parameter of the corresponding row to "NO". As the MSISDN is also adapted to infect the IMEIs it is used In, the IMEI is also tagged for interception and a new entry with the IMEI is added to the database 5 (step S405). Then, the database 5 comprises the following entry:

| IMI: | (IMSI = 88888, MSISDN = ?, | IMEI = 66666, | Intercept = Yes) |
|---|---|---|---|
| | (IMSI = 88888, MSISDN = 12345, | IMEI = ?, | Intercept = Yes) |

| | | | |
|---|---|---|---|
| IMI: | (IMSI = 33333, MSISDN = 54321, | IMEI = ?, | Intercept = No). |
| | (IMSI = 99999, MSISDN = 54321, | IMEI = ?, | Intercept = Yes). |
| | (IMSI = 99999, MSISDN = ?, | IMEI = 44444, | Intercept = Yes). |

Additionally, the non-volatile target database must also be checked to make sure that the old IMSI is no longer stored anywhere, as the interception activation is always actually activated based on the IMSI. A new IMEI-based entry is created in the target database (step S406). Then, the procedure returns to step S401 and waits for the receipt of a new notification.

Figure 5:
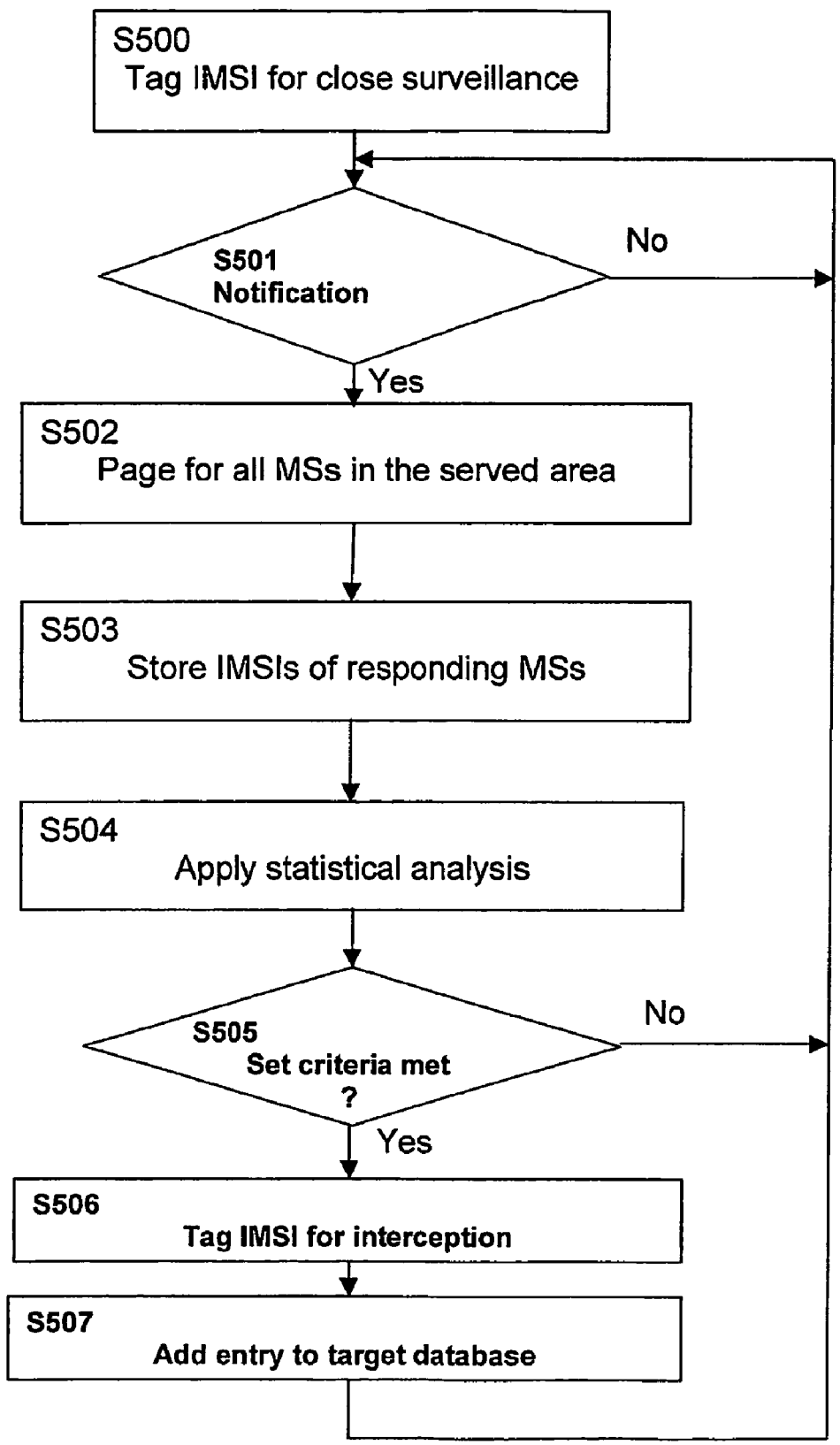
FIG. 5 shows a location-based infection of interception targets.

A final implementation example is shown in FIG. 5, where a schematic diagram of a target infection based on the location area is defined. In particular, if the location or location area of a specific SIM card is recurrently detected to be in the same location area as an already intercepted target, also this IMI is added to the list of intercepted targets in the database 5 and the non-volatile target database.

A certain IMSI, which is already intercepted, can be tagged for especially close surveillance (step S500). Then, it is checked in step S501 whether a notification has been received. If not, the procedure returns to step S501 until such a notification has been received. If so, e.g. if a Started-notification has been received for this IMSI, a base station (BS) or BSs controlled by a radio network controller (RNC) page for all mobile station in the served area (step S502). The IMSIs of the responding mobile stations are stored at the LIG 3 (step 503) and a statistical analysis is applied in step S504 to detect those IMSIs which recurrently appear in the same location area. Those IMSIs meeting the specific criteria of the statistical analysis, checked in step S505, e.g. a predetermined minimum number of occurrences within a predetermined time period or a predetermined maximum meantime between recurrent appearances or the like, are then tagged for interception (step S506) in the database 5 and then stored in the target database (step S507). Then, the procedure returns to step S501 and waits for the receipt of a new notification.

Due to the fact that legal issues in some countries may require that a warrant is obtained for intercepting any target with a new identifier, the operator needs a formal notification of the new interception authorization. Thus, new entries to the target database could be stored with a status, e.g. "request for authorization", and the concerned users of the LEA 8 or the LIG 3 should be notified correspondingly.

As an alternative implementation example of the preferred embodiment, both MSISDN or IMSI and IMEI could be stored for each target and a new entry is only created to the target database, if there is no matching party's identifier and party's equipment identifier pair, MSISDN-IMEI pair. The interception would then be activated when either MSISDN (IMSI) or IMEI matches.

In summary, the solution suggested in the preferred embodiment provides the advantage that the automated SIM infection gives better coverage on the target, regardless of the usage of different mobile stations or user equipments. No connections are missed as each new IMI set generates a new entry in the database. Furthermore, manual work is reduced due to the automatic data processing. The automated SIM infecting also enables quantitative analysis of the SIM and equipment usage, and thus gives means to e.g. predicting a criminal behavior. Similarly, the location-based tagging might also require a quantitative analysis.

It is noted that the present invention is not restricted to the specific features of the above preferred embodiment, but can be used in all types of communications networks such as GSM systems including circuit switched or packet switched systems. The invention is of course also applicable to any other communication network effecting mobile or fixed communication. Particularly, the invention is also applicable to pure packet switched networks like the future IP-based networks. Any kind of party's identifier data and party's equipment identifier data may be stored in the database 5, based on which the correspondence is checked and new entries are added. The preferred embodiment may thus vary within the scope of the attached claims.

The invention claimed is:

1. A method comprising:
storing a link information linking at least two types of identifier data for identifying parties to be monitored;
checking a correspondence between said stored link information of a monitored party and identifier data supplied from a communication network for said monitored party when a communication is originated from or received by said monitored party; and
adding to said stored link information of said monitored party a new entry with a new link information linking supplied non-matching identifier data detected in said checking step to a stored other type of said at least two types of identifier data linked by said stored link information;
wherein said at least two types of identifier data comprise a location area of said monitored party, and said correspondence is checked by applying a statistical analysis concerning the appearance within said location area.

2. The method according to claim 1, wherein said link information is a look-up table.

3. The method according to claim 1, wherein said at least two types of identifier data comprise a party's identification data and a party's equipment identification data.

4. The method according to claim 3, wherein said party's identification data comprises at least one of an International Mobile Subscriber Identity (IMSI), an Mobile Subscriber ISDN Number (MSISDN) and an International Mobile User Identity (IMUI), and said party's equipment identification data comprises an International Mobile Station Equipment Identity (IMBI).

5. The method according to claim 4, wherein said IMSI is updated in said stored link information based on said supplied identifier data.

6. The method according to claim 3, wherein said correspondence is checked by comparing a pair of party's identification data and party's equipment identification data.

7. A method according to claim 6, wherein said supplied identifier data is obtained by said communication network based on a paging operation within said location area.

8. The method according to claim 1, wherein said non-matching identifier data comprises an IMSI and said other type of identifier data corresponds to said location area.

9. An apparatus comprising:
- a memory means for storing a link information linking at least two types of identifier data for identifying parties to be monitored;
- a checking control unit for checking a correspondence between said stored link information of a monitored party and identifier data supplied from a communication network for said monitored party when a communication is originated from or received by said monitored party; and
- memory control unit for adding to said link information of said monitored party stored in said memory a new entry with a new link information linking supplied non-matching identifier data of said monitored party, detected by said checking control unit, to a stored other type of said at least two types of identifier data linked by said stored link information;
- wherein said checking control unit is arranged to check said correspondence by applying a statistical analysis concerning the appearance within a location area of said monitored party.

10. The apparatus according to claim 9, wherein said at least two types of identifier data comprise a party's identification data and a party's equipment identification data.

11. The apparatus according to claim 10, wherein said party's identification data comprises at least one of an IMSI, an MSISDN and an IMUI, and said party's equipment identification data comprises an IMEI.

12. The apparatus according to claim 10, wherein said memory control unit is arranged to update said IMSI in said stored link information based on said supplied identifier data.

13. The apparatus according to claim 10, wherein said checking control unit is arranged to check said correspondence by comparing a pair of party's identification data and party's equipment identification data.

14. The apparatus according to claim 9, wherein said network device is a lawful interception gateway.

15. An apparatus comprising:
- memory means for storing a link information linking at least two types of identifier data for identifying parties to be monitored;
- checking means for checking a correspondence between said stored link information of a monitored party and identifier data supplied from a communication network for said monitored party when a communication is originated from or received by said monitored party;
- memory control means for adding to said link information of said monitored party stored in said memory means a new entry with a new link information linking supplied non-matching identifier data of said monitored party, detected by said checking means, to a stored other type of said at least two types of identifier data linked by said stored link information;
- wherein said checking means is arranged to check said correspondence by applying a statistical analysis concerning the appearance within a location area of said monitored party.

16. A computer-readable storage medium storing a computer program product comprising code means which when run on a computer device, will cause the computer device to perform a method comprising:
- storing a link information linking at least two types of identifier data for identifying parties to be monitored;
- checking a correspondence between said stored link information of a monitored party and identifier data supplied from a communication network for said monitored party when a communication is originated from or received by said monitored party; and
- adding to said stored link information of said monitored party a new entry with a new link information linking supplied non-matching identifier data of said monitored party detected in said checking step to a stored other type of said at least two types of identifier data linked by said stored link information;
- wherein said at least two types of identifier data comprise a location area of said monitored party, and said correspondence is checked by applying a statistical analysis concerning the appearance within said location area.

* * * * *

UNITED STATES PATENT AND TRADEMARK OFFICE
CERTIFICATE OF CORRECTION

PATENT NO. : 7,487,238 B2  Page 1 of 1
APPLICATION NO. : 10/508727
DATED : February 3, 2009
INVENTOR(S) : Pohja et al.

It is certified that error appears in the above-identified patent and that said Letters Patent is hereby corrected as shown below:

<u>Column 10,</u>

Line 54, "(IMBI)" should read --(IMEI)--.

Signed and Sealed this

Fifth Day of May, 2009

JOHN DOLL
*Acting Director of the United States Patent and Trademark Office*